United States Patent [19]

Neumeyer

[11] Patent Number: 4,714,033
[45] Date of Patent: Dec. 22, 1987

[54] SHANK-MOUNTED PRESS WHEEL ASSEMBLY

[75] Inventor: Lowell H. Neumeyer, Des Moines, Iowa

[73] Assignee: Deere & Company, Moline, Ill.

[21] Appl. No.: 893,526

[22] Filed: Aug. 6, 1986

[51] Int. Cl.⁴ .............................................. A01C 7/20
[52] U.S. Cl. ................................................... 111/85
[58] Field of Search .............. 172/763, 705, 764, 672, 172/193, 194, 707, 551, 573, 538, 156; 111/7, 85, 73, 66, 68, 86, 73, 54, 69, 70, 80, 79

[56] References Cited

U.S. PATENT DOCUMENTS

| 309,403 | 12/1884 | Otstot | 111/85 |
|---|---|---|---|
| 2,259,890 | 10/1941 | Hipple | 172/707 X |
| 2,738,969 | 3/1956 | Morris | 111/85 |
| 2,849,969 | 9/1958 | Taylor | 111/7 |
| 4,296,695 | 10/1981 | Quanbeck | 111/73 |
| 4,579,071 | 4/1986 | Johnson | 111/85 |
| 4,608,933 | 9/1986 | Wyrill | 172/176 |

Primary Examiner—Richard J. Johnson

[57] ABSTRACT

A shank-mounted press wheel assembly includes a main shank bracket cast as a unitary structure and adapted for securing against the aft face of a shank by a single U-bolt. The cast structure includes an integral transverse pivot for mounting a fore-and-aft extending press wheel drawbar and a rearwardly extending leg for receiving the upper end of a tension link supporting a compression spring for providing adjustable down-pressure on the press wheel. Vertical adjustments of the press wheel assembly may be made quickly and conveniently by simply loosening two nuts on the U-bolt which secures the bracket to the shank. Angular travel stops for the drawbar are provided by a locknut on the tension link and by the solid compressed length of the coil spring. An adjustable wheel support located on the aft end of the drawbar permits the press wheel center line to be adjusted with respect to the tool shank center line.

8 Claims, 4 Drawing Figures

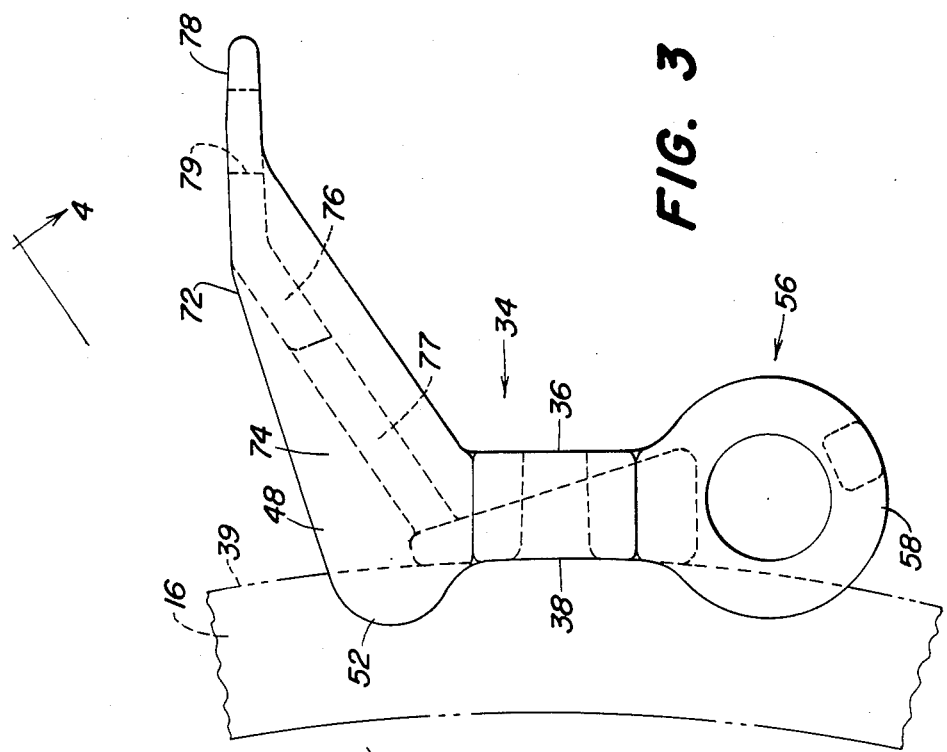
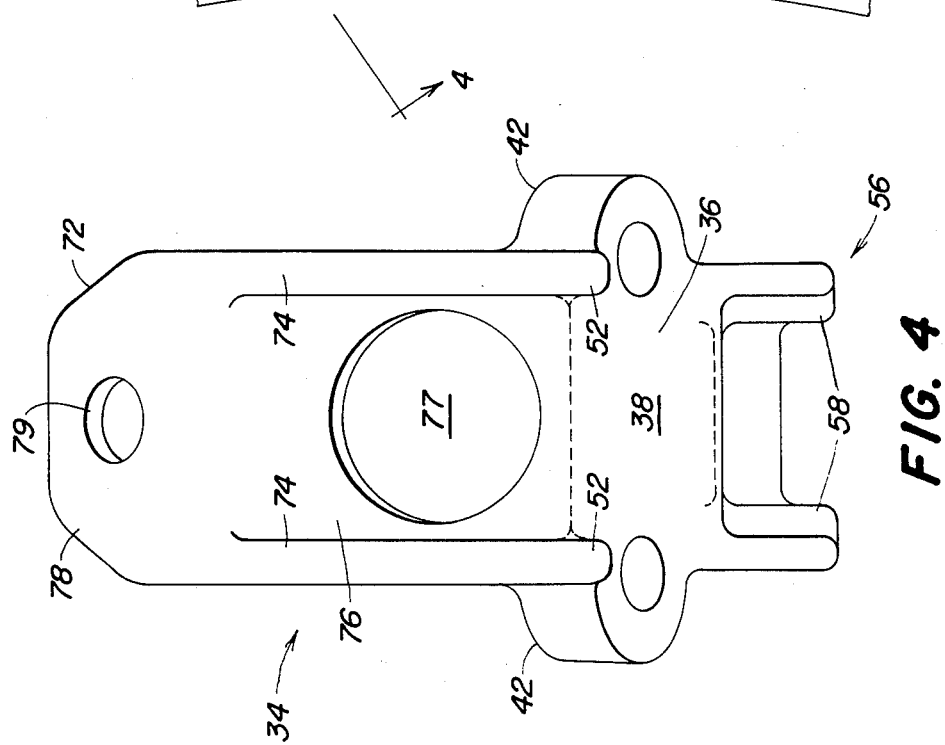

SHANK-MOUNTED PRESS WHEEL ASSEMBLY

FIELD OF THE INVENTION

The present invention relates generally to seeding implements, and more specifically, to an adjustable press wheel assembly adapted for connection to the shank of an opener on an implement such as an air seeder.

BACKGROUND OF THE INVENTION

Seeding implements, such as the John Deere model 665 Air Seeder utilize earth working tools mounted on chisel plow shanks for working the soil and depositing seeds behind the shanks. In certain soil conditions it is necessary to pack the soil firmly over the seeds to assure good, uniform germination. Various types of press wheels arrangements, such as trailing press wheel gangs or individual frame-mounted press wheel assemblies have been utilized, but these types of arrangements are often not suited for uneven terrain and do not track well during turns. Individual press wheel assemblies often are cumbersome and expensive, and space limitations on the main frame can hinder proper placement. Shank-mounted press wheels assemblies, such as shown in U.S. Pat. No. 4,579,071, are available for mounting on the shank of an implement such as an air seeder. Although such devices have improved press wheel tracking and are less bulky and easier to mount than some of the previously available press assemblies, vertical adjustment of such devices along the shank as well as adjustment of the press wheel arm with respect to the press wheel mounting bracket can be inconvenient and time consuming. Typically, press wheel arm down-pressure is achieved utilizing extension or torsion springs which are subject to fatigue and breakage adjacent the connecting or hooked end portions. Soil and trash flow around the shank adjacent the area of the press wheel assembly mounting can be impeded since portions of the press wheel bracket extend outwardly beyond the sides of the shank.

OBJECTS OF THE INVENTION

It is therefore an object of the present invention to provide an improved shank-mounted press wheel assembly. It is a further object to provide such an assembly which overcomes many of the aforementioned problems.

It is yet another object of the present invention to provide an improved shank-mounted press wheel assembly which is easier and more convenient to adjust than at least most previously available assemblies. It is a further object to provide such an assembly which eliminates torsion springs and extension springs.

It is still another object of the present invention to provide an improved shank-mounted press wheel assembly which is more compact and streamlined than at least most previously available assemblies for reduced bulk and improved trash and soil flow around the shank.

It is a further object to provide an improved shank-mounted press wheel assembly which is more easily adjustable vertically along the shank than at least most previously available assemblies and which has more easily adjusted down limit and range adjustments. It is another object to provide such an assembly which is connected to the shank by a single U-bolt.

It is a further object of the present invention to provide an improved shank-mounted press wheel assembly which is more compact, more reliable and more easily adjustable than most previously available assemblies, and which includes structure for providing transverse adjustment of the press wheel for better alignment of the press wheel with the formed furrow.

BRIEF DESCRIPTION OF THE INVENTION

The shank-mounted press wheel assembly of the present invention includes a compact, unitarily cast main bracket structure which is slidably positionable along the aft face of the curved shank of an air seeder or the like. The main bracket includes a central portion adapted for positioning against the aft face of the shank and extends upwardly therefrom to an end portion which includes a pair of transversely spaced and forwardly projecting ears adapted for positioning closely adjacent the side of the shank. The lower portion of the main bracket includes an integral cast transverse pivot area located closely adjacent the aft face of the shank. A single U-bolt extends through the central portion of the main bracket around the shank, and a pair of easily accessable nuts are threaded onto the U-bolt for securing the main bracket to the shank and permitting convenient adjustment of the bracket vertically along the lower portion of the shank. An upper leg extends rearwardly and upwardly from the forwardly projecting ears and terminates in a generally horizontal abutment surface. The leg is apertured to receive the seed tube. A substantial portion of the main bracket lies in the shadow of the shank, and the bracket is fabricated to provide minimum resistance to trash and soil flow past the shank. A press wheel mounting arm is pivotally connected to the pivot area adjacent one side of the shank and extends rearwardly therefrom to an aft end which adjustably mounts a trailing press wheel. An internally threaded hex piece secures a collar to the aft end of the arm and a wheel is mounted on the collar. Washers can be selectively inserted or removed from the collar area to provide transverse adjustment of the press wheel. A pin is connected to the press wheel arm rearwardly of the pivot area and receives the eye-end of an eyebolt which extends upwardly therefrom through an aperture in the abutment surface. A compression spring encircles the shank of the eyebolt and is compressed between the eye-end and the abutment surface for urging the press wheel arm downwardly about the pivot area. The down limit, or carry height, of the press wheel can be adjusted by adjusting the nut threaded onto the end of the eyebolt above the abutment surface. The pivot range of the trailing press wheel arm is determined by the fully compressed length of the compression spring and by the threaded adjustment of the nut against the abutment surface.

The structure is very compact and streamlined for improved trash and soil flow. Vertical adjustment along the shank can be quickly made by simply loosening two nuts, and down-pressure can be adjusted as desired.

These and other objects, features and advantages of the present invention will become apparent to one skilled in the art upon reading the following detailed description taken with the drawings.

BRIEF DESCRIPTION OF THE DRAWINGS

FIG. 3 is an enlarged side view of the main bracket of the press wheel assembly.

FIG. 4 is a view taken substantially along lines 4—4 of FIG. 3.

DESCRIPTION OF THE PREFERRED EMBODIMENT

Figure 1:
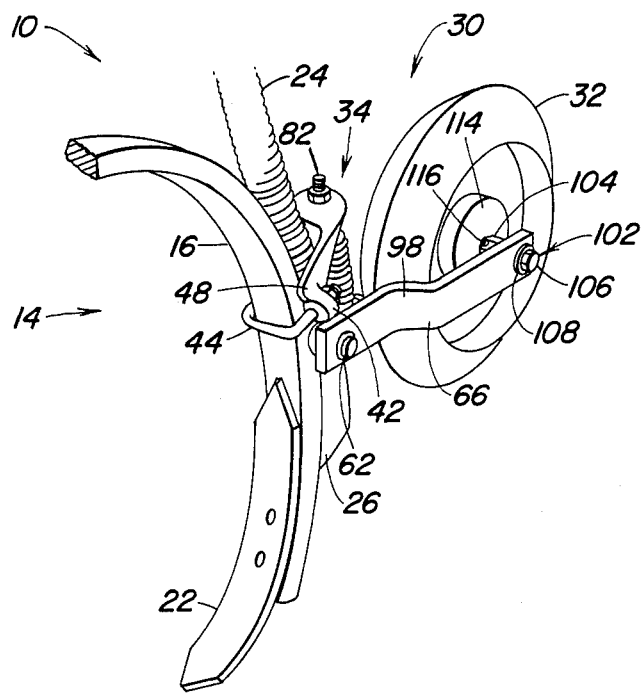
FIG. 1 is a front perspective view of a portion of a seeding implement showing the adjustable shank-mounted press wheel assembly of the present invention.
Figure 2:
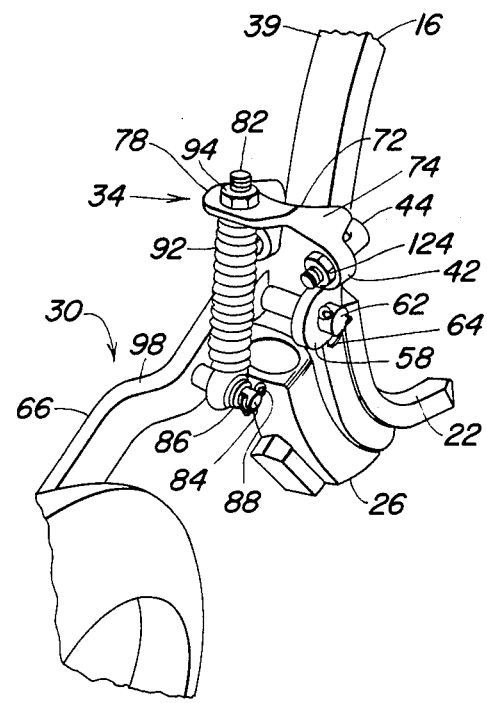
FIG. 2 is a rear perspective view of the press wheel assembly of FIG. 1 with the seed tube removed.

Referring now to FIG. 1, there is shown a portion of a seeding implement 10, including a transversely extending main frame (not shown) adapted for towing forwardly over a field. Transversely spaced along the main frame are a plurality of chisel plow shank assemblies 14 having downwardly and rearwardly extending shanks 16 biased downwardly into a soil engaging position by conventional spring assemblies (not shown). The lower ends of the shanks 16 support earth working tools such as shovels or hoes 22 for opening a furrow in the soil into which is deposited seed from a seed tube 24 and seed boot 26 located rearwardly of the earth working tool 22.

A shank-mounted press wheel assembly 30 is adjustably positioned on the shank 16 and includes a trailing press wheel 32 for firming the soil over the seeds deposited in the furrow. The assembly 30 includes a main shank bracket 34 fabricated as an integral cast structure and having a central portion 36 with a slightly forwardly curved forward face 38 adapted to be received against aft face 39 of the shank 16. Rounded apertured projections 42 extend outwardly from the central portion 36 for receiving the threaded ends of a U-bolt 44 on either side of the shank 16. The shank bracket 34 also includes an upper end portion 48 having forwardly projecting and transversely spaced ears 52 adapted for embracing the opposite sides of the shank 16 for preventing rotation of the bracket 34 on the shank when attached thereto by the U-bolt 44.

At the lower end of the central portion 36, a rearwardly projecting pivot area 56 including a pair of rearwardly projecting and transversely spaced apertured ears 58 extend rearwardly below each of the rounded apertured projections 42. A pivot pin 62 extends transversely through the apertures in the pivot area 56, and a locking pin 64 is inserted through one end of the pivot pin 62. The opposite end of the pivot pin 62 is fixed to the forward end of a fore-and-aft extending drawbar 66 which rotatably mounts the trailing press wheel 32.

The cast shank bracket 34 includes a rearwardly and upwardly projecting leg 72 having upright sides 74 forming rearward extensions of the respective ears 52. A web portion 76 having a seed tube opening 77 extends upwardly and rearwardly between the upright sides 74, terminating in a generally horizontally disposed abutment surface 78. The abutment surface 78 is apertured at 79 and receives the upper threaded end of an eyebolt 82. The eye-end of the bolt 82 is pivotally connected to a transverse pivot 84 which is fixed to the drawbar 66 rearwardly of the pivot area 56 and below the abutment surface 78. The eye-end of the eyebolt 82 is secured on the pivot 84 by a washer 86 and cotter pin 88. A coil spring 92 encircles the shank of the eyebolt 82 and is compressed between the abutment surface 78 and the eye-end of the eyebolt 82. A locknut 94 threaded on the end of the eyebolt 82 limits the downward pivoting of the drawbar 66 with respect to the shank bracket 34 to a preselected position dependent upon the adjustment of the nut 94. Upward rocking of the drawbar 66 with respect to the bracket 34 is limited by the compressed length of the coil spring 92.

The drawbar 66 extends outwardly at a location 98 rearwardly of the location of the transverse pivot 84 and then rearwardly to a connection with an adjustable wheel support mounting 102. The mounting 102 includes an internally threaded hex piece 104 secured to the inside of the drawbar 66 by a bolt 106 which extends through an aperture in the aft end of the drawbar 66 and through a set of spacing washers 108. The wheel 32 includes an axle supported by bearings 114 and secured in the hex piece 104 by a setscrew 116. The press wheel 32 may be adjusted transversely by rearranging the spacing washers 108 on the bolt 106.

The U-bolt 44 secures the main shank bracket 34 to the preselected location on the shank 16. A pair of nuts 124 are threaded onto the ends of the U-bolt 44 and bear against the projections 42 to urge the curved forward face 38 of the central portion 36 against the aft face 39, of the shank 16. By simply loosening the two nuts 124, the main shank bracket 34 may be repositioned along the shank 16 to provide down-pressure adjustment of the press wheel 32. Preferably, the arrangement of the pivot 84 with respect to the abutment surface 78 provides an increasing down-pressure with upward rocking of the drawbar 66 about the pivot pin 62. Therefore, by adjusting the bracket 34 to a lower position on the shank 16, downward bias on the press wheel 32 is increased. Adjusting the bracket 34 upwardly on the shank 16 tends to decrease the down-pressure applied to the press wheel 32. The structure of the bracket 34 provides convenient access to both the locknut 94 for adjusting the angular limits of the drawbar 66, and to the U-bolt nuts 124 for adjusting the vertical position of the assembly 30 on the shank 16. These adjustments may be made relatively easily and conveniently without removal of any components. The particular arrangement of the assembly 30 minimizes the amount of transversely projecting portions which extend outwardly of the sides of the shank 16 and thereby minimizes disturbance to soil and trash flow past the shank. The seed tube 24 which extends through the opening 77 is conveniently maintained and protected by the bracket closely adjacent the aft face 39.

Having described the preferred embodiment, it will be apparent that modifications can be made without departing from the scope of the invention as defined in the accompanying claims.

I claim:

1. In an implement having a shank-supported tool adapted for forward movement through the soil, a shank-mounted press wheel assembly adapted for connecting a fore-and-aft extending press wheel arm to the shank, the assembly comprising:

a bracket body having an upright central portion adapted for positioning against the aft face of the shank, an upper end portion connected to the upper end of the central portion and including forwardly projecting and transversely spaced ears adapted for positioning closely adjacent the sides of the shank, a lower end portion connected to the lower end of the central portion and including a rearwardly projecting transversely apertured pivot area closely adjacent the aft face of the shank, and a leg extending rearwardly from the upper end portion;

means pivotally connecting the press wheel arm to the pivot area for rocking vertically with respect to the bracket body;

a down-pressure spring;

means for supporting the down-pressure spring between the leg and the press wheel arm; and clamp means for selectively securing the body to the aft face and permitting adjustment of the body vertically along the length of the shank.

2. The invention as set forth in claim 1 wherein the means pivotally connecting the press wheel arm supports the forward end of the arm outwardly adjacent one side of the shank.

3. The invention as set forth in claim 2 wherein the bracket body comprises a unitary casting and the leg includes upright sides which define a rearward extension of the ears.

4. The invention as set forth in claim 1 wherein the clamp means comprises a single U-bolt adapted for extending around the shank, and the bracket body includes a pair of apertured portions for receiving the ends of the U-bolt.

5. The invention as set forth in claim 1 wherein the means for supporting the spring comprises an eyebolt having an eye-end pivotally connected to the press wheel arm and a threaded end extending through the leg, said down-pressure spring encircling the eyebolt and compressed between the eye-end and the leg, and means threaded onto the threaded end for contacting the leg and limiting the downward rocking of arm.

6. The invention as set forth in claim 1 including a press wheel, and means mounting the press wheel on the aft end of the arm, said means mounting including means for transversely adjusting the press wheel with respect to the arm.

7. The invention as set forth in claim 1 wherein the leg extends rearwardly from the ears and includes a web portion with an opening, said assembly further comprising a seed tube extending through the web portion opening.

8. The invention as set forth in claim 1 wherein the central portion is curved forwardly and includes a pair of rounded apertured projections, said clamp means including a single U-bolt extending around the shank and through the apertured projections.

* * * * *